(12) United States Patent
Harada et al.

(10) Patent No.: US 11,751,149 B2
(45) Date of Patent: Sep. 5, 2023

(54) USER TERMINAL AND RADIO COMMUNICATION METHOD

(71) Applicant: NTT DOCOMO, INC., Tokyo (JP)

(72) Inventors: Hiroki Harada, Tokyo (JP); Daiki Takeda, Tokyo (JP); Satoshi Nagata, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 58 days.

(21) Appl. No.: 16/961,591

(22) PCT Filed: Jan. 11, 2018

(86) PCT No.: PCT/JP2018/000541
§ 371 (c)(1),
(2) Date: Jul. 10, 2020

(87) PCT Pub. No.: WO2019/138519
PCT Pub. Date: Jul. 18, 2019

(65) Prior Publication Data
US 2021/0068064 A1   Mar. 4, 2021

(51) Int. Cl.
*H04W 56/00* (2009.01)
*H04W 52/02* (2009.01)
(Continued)

(52) U.S. Cl.
CPC ..... *H04W 56/001* (2013.01); *H04W 52/0209* (2013.01); *H04W 56/0055* (2013.01); *H04W 72/23* (2023.01); *H04W 72/30* (2023.01)

(58) Field of Classification Search
CPC ........... H04W 56/001; H04W 52/0209; H04W 56/0055; H04W 72/005; H04W 72/042;
(Continued)

(56) References Cited

U.S. PATENT DOCUMENTS

| | | | |
|---|---|---|---|
| 2018/0124744 A1* | 5/2018 | Xue | H04W 72/005 |
| 2019/0200307 A1* | 6/2019 | Si | H04L 27/2666 |

(Continued)

FOREIGN PATENT DOCUMENTS

| | | | | |
|---|---|---|---|---|
| EP | 3 711 390 A1 | 9/2020 | | |
| EP | 3713136 A1 * | 9/2020 | | H04L 5/0048 |

(Continued)

OTHER PUBLICATIONS

International Search Report issued in Application No. PCT/JP2018/000541, dated Mar. 27, 2018 (3 pages).

(Continued)

*Primary Examiner* — Charles C Jiang
*Assistant Examiner* — Shawn D Miller
(74) *Attorney, Agent, or Firm* — Osha Bergman Watanabe & Burton LLP

(57) ABSTRACT

To prevent occurrence of delay and/or increase in power consumption at the time of access to a network in future radio communication systems, one aspect of a user terminal according to the present disclosure includes: a receiving section that receives a synchronization signal block including a broadcast channel in a certain sync raster; and a control section that controls, based on certain bit information of a certain information element included in the synchronization signal block, a sync raster to be detected by variably interpreting bit information included in at least one of the certain information element and another information element.

7 Claims, 12 Drawing Sheets

(51) Int. Cl.
*H04W 72/23* (2023.01)
*H04W 72/30* (2023.01)

(58) Field of Classification Search
CPC .......... H04W 52/0229; Y02D 30/70; H04J 11/0086; H04J 11/0073; H04J 11/0076; H04L 27/2655
See application file for complete search history.

(56) References Cited

U.S. PATENT DOCUMENTS

| | | | |
|---|---|---|---|
| 2020/0067754 A1* | 2/2020 | Jung | H04L 27/2613 |
| 2020/0146041 A1* | 5/2020 | Kim | H04W 72/0446 |
| 2020/0229113 A1* | 7/2020 | Yoon | H04W 56/001 |
| 2020/0266959 A1* | 8/2020 | Yi | H04J 11/00 |
| 2020/0305125 A1 | 9/2020 | Tang et al. | |
| 2020/0314777 A1* | 10/2020 | Liu | H04W 72/04 |
| 2020/0389871 A1* | 12/2020 | Wang | H04L 1/00 |
| 2020/0404537 A1 | 12/2020 | Harada | |
| 2021/0344470 A1 | 11/2021 | Si et al. | |

FOREIGN PATENT DOCUMENTS

| | | |
|---|---|---|
| EP | 3 720 036 A1 | 10/2020 |
| EP | 3 726 879 A1 | 10/2020 |
| WO | 2019/125063 A1 | 6/2019 |

OTHER PUBLICATIONS

Written Opinion issued in International Application No. PCT/JP2018/000541, dated Mar. 27, 2018 (3 pages).

3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).

B. Bertenyi et al. "5G NR Radio Interface" Journal of ICT Standardization, vol. 6, No. 1; Jan. 1, 2018 (28 pages).

Extended European Search Report issued in European Application No. 18899206.9, dated Jun. 17, 2021 (7 pages).

Office Action issued in the counterpart Indian Patent Application No. 202037032820, dated May 2, 2022 (5 pages).

LG Electronics; "RMSI delivery and CORESET configuration"; 3GPP TSG RAN WG1 Meeting #91, R1-1719894; Reno, USA; Nov. 27-Dec. 1, 2017 (15 pages).

Office Action issued in counterpart European Patent Application No. 18 899 206.9 dated Mar. 2, 2023 (8 pages).

Qualcomm; "WF on RMSI presence flag"; 3GPP TSG RAN WG1 #91, R1-1721684; Reno, U.S.A.; Nov. 27,-Dec. 1, 2017 (5 pages).

* cited by examiner

| | cellBarred/intraFreqReselection | PRESENCE OR ABSENCE OF RMSI | POSSIBILITY OF INITIAL ACCESS | SUBSEQUENT OPERATION OF UE |
|---|---|---|---|---|
| CASE 1 | notBarred/allowed | PRESENT | ALLOWED | ACCESS CELL/CARRIER |
| CASE 2 | notBarred/allowed | PRESENT | NOT ALLOWED | SEARCH FOR NEXT SYNC RASTER |
| CASE 3 | Barred/not allowed | ABSENT | NOT ALLOWED | SEARCH FOR NEXT SYNC RASTER |
| CASE 4 | Barred/not allowed | PRESENT | NOT ALLOWED | SEARCH FOR NEXT SYNC RASTER |

FIG. 4

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency and so on (see Non-Patent Literature 1). For the purpose of further high capacity, advancement of LTE (LTE Rel. 8, Rel. 9), and so on, the specifications of LTE-A (LTE-Advanced, LTE Rel. 10, Rel. 11, Rel. 12, Rel. 13) have been drafted.

Successor systems of LTE (referred to as, for example, "FRA (Future Radio Access)," "5G (5th generation mobile communication system)," "5G+ (plus)," "NR (New Radio)," "NX (New radio access)," "FX (Future generation radio access)," "LTE Rel. 14," "LTE Rel. 15" (or later versions), and so on) are also under study.

In the existing LTE systems (for example, LTE Rel. 8 to Rel. 13), a user terminal (UE (User Equipment)) detects a synchronization signal (a PSS (Primary Synchronization Signal) and/or an SSS (Secondary Synchronization Signal)) through an initial access procedure (also referred to as cell search and so on) to establish synchronization with a network (for example, a radio base station (eNB (eNode B))) and to identify a cell to be connected (identify the cell by a cell ID (Identifier), for example).

After performing the cell search, the UE further receives a master information block (MIB) that is transmitted on a broadcast channel (PBCH (Physical Broadcast Channel)), a system information block (SIB) that is transmitted on a downlink (DL) shared channel (PDSCH (Physical Downlink Shared Channel)), and so on to acquire configuration information (which may be referred to as broadcast information, system information and so on) used to establish communication with the network.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

For the future radio communication systems (for example, NR or 5G), defining a resource unit including a synchronization signal and a broadcast channel as a synchronization signal block, and performing initial access based on the SS block has been under study. The synchronization signal is also referred to as a PSS and/or an SSS or an NR-PSS and/or an NR-SSS and so on. The broadcast channel is also referred to as a PBCH or an NR-PBCH and so on. The synchronization signal block is also referred to as an SS block (Synchronization Signal block (SSB)) or an SS/PBCH block and so on.

The UE searches for a sync raster to be allocated at a certain frequency position in initial access. In NR, it is assumed that the frequency position of the SS/PBCH block in a carrier is in some cases allocated at a position other than the center, making it difficult to identify a search candidate position. If the SS/PBCH block is unable to be received despite appropriate search of a sync raster at the time of initial access, delay may occur and/or power consumption may be increased.

The present disclosure has an object to provide a user terminal and a radio communication method that enable prevention of occurrence of delay and/or increase in power consumption at the time of access to a network in future radio communication systems.

Solution to Problem

A user terminal according to one aspect of the present disclosure includes: a receiving section that receives a synchronization signal block including a broadcast channel in a certain sync raster; and a control section that controls, based on certain bit information of a certain information element included in the synchronization signal block, a sync raster to be detected by variably interpreting bit information included in at least one of the certain information element and another information element.

Advantageous Effects of Invention

According to the present invention, occurrence of delay and/or increase in power consumption can be prevented at the time of access to a network in future radio communication systems.

BRIEF DESCRIPTION OF DRAWINGS

FIG. 4 is a diagram to show an example of cases of an SS/PBCH block to be detected at the time of initial access;

DESCRIPTION OF EMBODIMENTS

Figure 1:
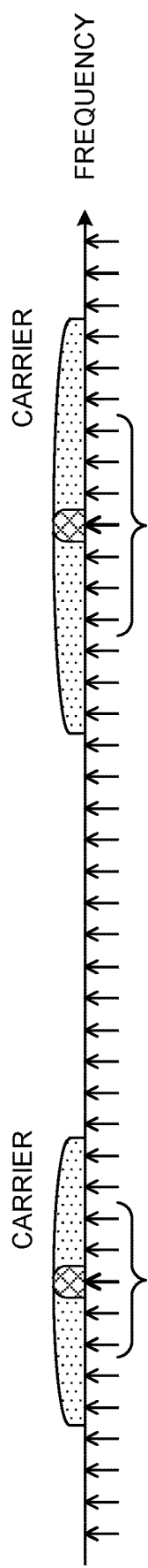
FIG. 1 is a diagram to show an example of SS search in existing LTE systems.

In the future radio communication systems (for example, LTE Rel. 14 or later versions, 5G, NR and so on), defining a signal block (also referred to as SS block, an SS/PBCH block and so on) including a synchronization signal (also referred to as an SS, a PSS and/or an SSS, or an NR-PSS and/or an NR-SSS and so on) and a broadcast channel (also referred to as a broadcast signal, a PBCH, or an NR-PBCH and so on) has been under study. A set of one or more signal blocks is also referred to as a signal burst (SS/PBCH burst or SS burst). A plurality of signal blocks in the signal burst are transmitted on different beams at different times (also referred to as beam sweep and so on).

In NR, the UE searches for (or monitors) a certain frequency position and acquires an SS/PBCH block at the time of access to a network (for example, initial access). In NR, it is assumed that a plurality of sync rasters (also referred to as SS (Synchronization Signal) rasters) to be frequency positions searched for at the time of initial access are configured for each individual band. For example, a plurality of them are configured in each of 0-2.65 GHz, 2.4-24.25 GHz, and 24.25-100 GHz. In one example, configuring 8832 of them in 0-2.65 GHz, configuring 15174 of them in 2.4-24.25 GHz, and configuring 4384 of them in 24.25-100 GHz has been under study.

MIBs (Master Information Blocks) in MSI (Minimum System Information) read by the UE at the time of initial access are carried on the PBCH. The remaining MSI constitutes RMSI (Remaining Minimum System Information), and corresponds to SIB (System Information Block) 1 and SIB2 in LTE. The RMSI is scheduled on the PDCCH specified by the MIBs.

For example, MIB contents (information elements) include SystemFrameNumber (6 MSBs of SystemFrameNumber), subCarrierSpacingCommon, Ssb-subcarrierOffset, Dmrs-TypeA-Position, pdcchConfigSIB1, cellBarred, intraFreqReselection, spare, 4 LSBs of SystemFrameNumber, Ssb-IndexExplicit, Half-frame-index and so on. As a matter of course, what is included in the MIB contents is not limited to the above.

Interpretation of some of the MIB contents may be different depending on which frequency band, a first frequency band or a second frequency band higher than the first frequency band, is used. For example, the first frequency band may be a frequency band (sub-6) that is lower than 6 GHz, and the second frequency band may be a frequency band (above-6) that is higher than 6 GHz. The first frequency band may be referred to as an FR (Frequency Range) 1. The second frequency band may be a frequency band higher than 24 GHz, and may be referred to as FR2, above-24, millimeter waves and so on.

SystemFrameNumber is used to report the six most significant bits of a system frame number (SFN). subCarrierSpacingCommon is used to report a subcarrier spacing (SCS, numerology) for receiving the RMSI. Ssb-subcarrierOffset is used to report a PRB (Physical Resource Block) grid offset for receiving the RMSI. Dmrs-TypeA-Position is used to report whether the position of a symbol of a DMRS for a PDSCH is the third symbol or the fourth symbol in a slot. pdcchConfigSIB1 is used to report a parameter set (PDCCH parameter set) of the PDCCH (or a CORESET (Control Resource Set) including the PDCCH, RMSI CORESET) for receiving the RMSI. cellBarred is used to report whether or not a cell in question cannot be camped on (currently in service) (Barred/notBarred). intraFreqReselection is used to report whether or not a cell that can be camped on is present in the same frequency (carrier band) (allowed/not allowed). spare indicates spare bits, and may be used for a specific purpose. 4 LSBs of SystemFrameNumber is used to report the four least significant bits of the SFN.

In above-6, Ssb-IndexExplicit is used to report the three most significant bits of an SSB index. In sub-6, one bit of Ssb-IndexExplicit is used in conjunction with Ssb-subcarrierOffset.

When the maximum number of SSB indexes is 64, six bits may be necessary. In above-6, the number of SSB indexes may be larger than 8, and in sub-6, the number of SSB indexes is by no means larger than 8. In sub-6, one specific bit of Ssb-IndexExplicit is used in conjunction with four bits of Ssb-subcarrierOffset, making Ssb-subcarrierOffset consist of five bits. The three least significant bits may be implicitly reported by using a DMRS for a PBCH.

Half-frame-index is used to report whether an SSB in question belongs to the first half frame of 5 ms or the last half frame of 5 ms of a radio frame (10 ms). A CRC is a code of a cyclic redundancy check generated based on the above pieces of information.

As has been described above, a necessary number of bits and a necessary number of code points are determined for each of the MIB contents. For example, Ssb-subcarrierOffset represents an offset between the PRB (PRB for data) based on the center frequency of the carrier and the PRB of the SSB, using the number of subcarriers. For example, when the subcarrier spacings of the SSB and the RMSI are the same, Ssb-subcarrierOffset uses 12 code points (values of 0 to 11) of four bits, because one PRB consists of 12 subcarriers.

In some of the MIB contents, bits and/or code points may be reserved. The code point is a value represented using bits.

For example, in sub-6, one bit of an information element corresponding to an index of the SS/PBCH block (Ssb-IndexExplicit) is used in conjunction with an information element corresponding to a subcarrier offset of the SS/PBCH (Ssb-subcarrierOffset), and thus the other two bits are reserved. For example, in above-6, Ssb-subcarrierOffset uses up to 12 code points (values of 0 to 11) of 16 code points of four bits, and thus at least four code points are reserved. In sub-6, Ssb-subcarrierOffset uses up to 24 code points (values of 0 to 23) of 32 code points of five bits in conjunction with one bit of Ssb-IndexExplicit, and thus at least eight code points are reserved.

Incidentally, in the existing LTE systems, a cell-specific reference signal (CRS) is transmitted in each subframe, and a synchronization signal is invariably fixed to be mapped to the center of a carrier. This allows the UE to identify, to a certain degree, a frequency position at which SS search is to be performed with reference to the spectrum of received power even if there is no occurrence of data traffic (see FIG. 1).

In contrast, in NR, a transmission period of the SS/PBCH block to be used for initial access and so on can be set longer. The frequency position of the SS/PBCH block in a carrier is in some cases allocated at a position other than the center. Thus, in NR, identification of a search candidate position as used in the existing LTE systems is unable to be applied, which may cause difficulty with identification of a search candidate position in comparison with the existing LTE systems.

Figure 2:
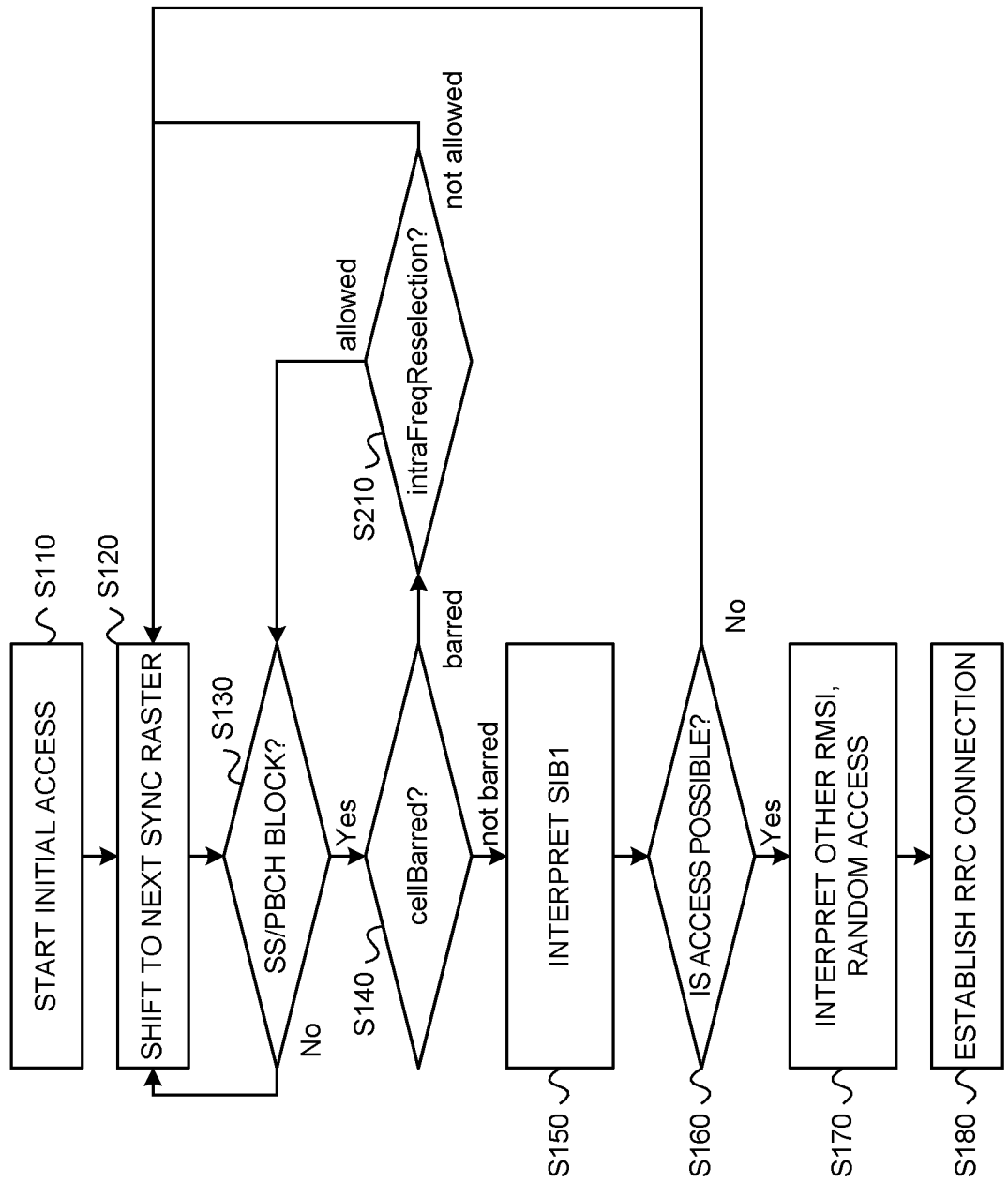
FIG. 2 is a flowchart to show an example of an operation of initial access.

In this case, sequentially examining a plurality of sync rasters one by one at the time of initial access is conceivable. One example of an operation performed by the UE at the time of initial access will be described with reference to FIG. 2.

When the UE starts initial access (S110), the UE shifts a frequency position at which SS/PBCH block is to be searched to the next sync raster defined in advance (S120). Subsequently, the UE determines whether or not an SS/PBCH block has been detected (S130).

If no SS/PBCH block is detected (S130: not detected), the UE proceeds the processing to S120 (searches for an SS/PBCH block in the next sync raster).

If an SS/PBCH block is detected (S130: Yes), the UE determines whether or not cellBarred of the PBCH indicates "barred" (S140).

If cellBarred indicates "barred" (S140: barred), the UE determines whether or not intraFreqReselection of the PBCH indicates "allowed" (S210).

If intraFreqReselection indicates "allowed" (S210: allowed), the UE proceeds the processing to S130 (checks for another SS/PBCH block detected in the same carrier band).

If intraFreqReselection indicates "not allowed" (S210: not allowed), the UE proceeds the processing to S120 (searches for an SS/PBCH block in another carrier band).

If cellBarred indicates "not barred" (S140: not barred), the UE reads SIB1 in RMSI associated with the SS/PBCH block (S150). Subsequently, the UE determines whether or not the UE can access the cell (S160).

If the UE cannot access the cell, for example, if a PLMN (Public Land Mobile Network)-ID is not available (S160: No), the UE proceeds the processing to S120.

If the UE can access the cell (S160: Yes), the UE reads other RMSI to perform random access (S170), establishes an RRC connection (S180), and terminates the processing.

According to the above operation, the UE sequentially searches for a plurality of SS rasters defined in a specification in advance to detect an accessible SS/PBCH block, and can thereby perform random access based on RMSI associated with the SS/PBCH block.

When a plurality of sync rasters are sequentially searched, however, it may require some time to detect an appropriate sync raster. This may cause occurrence of delay and/or increase power consumption at the time of access to a network (for example, initial access).

To solve such a problem, using information elements (MIB contents) of the PBCH included in the SS/PBCH block is conceivable.

As described above, the UE searches for an SS/PBCH block in the sync raster at the time of initial access. To perform initial access, the UE needs to read RMSI (or an SIB) including information related to a random access channel (RACH). Therefore, in an NR cell for standalone (SA), for an SSB for initial access, RMSI associated with the SSB is transmitted.

In contrast, for an SS/PBCH block not used for initial access, for example, for an SS/PBCH block of a cell (for example, an NR cell for non-standalone (NSA), or a cell for NSA) used only for a secondary cell (SCell), RMSI associated with the SS/PBCH block may not be present (may not be transmitted). In the SS/PBCH block in a cell for NSA, if cellBarred indicates "Barred" and all the cells in the carrier are cells for NSA, intraFreqReselection indicates "not allowed".

In the SS/PBCH block without associated RMSI, an information element used for receiving the RMSI is not used. Examples of the information element used for receiving the RMSI include an information element used to report a PDCCH configuration (pdcchConfigSIB1), an information element used to report the PRB grid offset for receiving the RMSI (Ssb-subcarrierOffset) and so on.

Thus, information for reporting presence or absence of associated RMSI is defined for reserved code points of a certain information element (for example, Ssb-subcarrierOffset) included in the PBCH. When the report of Ssb-subcarrier-offset indicates that associated RMSI is not present (no associated RMSI), bits (for example, eight bits) of an information element used to report a PDCCH configuration for receiving the RMSI (pdcchConfigSIB1) can be used for another purpose.

Figure 3:
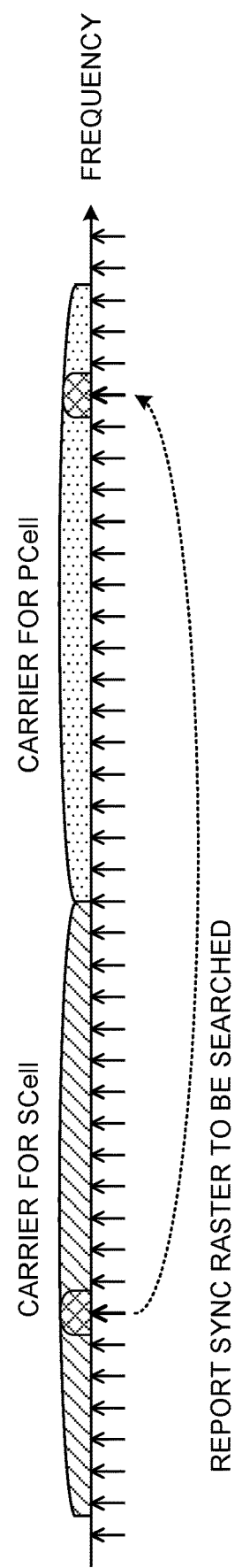
FIG. 3 is a diagram to show an example of a case in which a sync raster to be detected next is reported by using an SS/PBCH block.

Under such circumstances, reporting information related to a sync raster that the UE is to search next by using above-mentioned pdcchConfigSIB1 is conceivable. In other words, information related to a sync raster to be searched next (for example, an SS/PBCH block for a PCell) is reported to the UE by using an SS/PBCH block (for example, an SS/PBCH block for an SCell) not supporting initial access mapped on a sync raster (see FIG. 3). In other words, the UE judges a sync raster to be searched next by using reserved code points of Ssb-subcarrierOffset and pdcchConfigSIB1.

In contrast, when a sync raster to be detected next is reported by using bits included in pdcchConfigSIB1 and so on, a sync raster position may not be present within a frequency range that can be specified with the bits. Such a case may hinder appropriate reporting of a sync raster to the UE.

In view of this, the inventors of the present invention focused on that a position of a sync raster used to transmit an SS/PBCH block supporting initial access may be absent within a certain frequency range, and came up with the idea of switching pieces of information to be reported to the UE by using an SS/PBCH block (or a sync raster) not supporting initial access, depending on whether or not a sync raster capable of initial access is present within a certain frequency range.

For example, the base station reports, to the UE, presence or absence of a sync raster capable of initial access within a certain range by using bit information (for example, one bit) of a certain information element. The UE controls search of a sync raster by variably interpreting bit information included in pdcchConfigSIB1 and so on (by changing interpretation in the UE), based on the bit information.

Alternatively, at least one of information indicating that a sync raster capable of initial access is not present within a certain range and information enabling identification of a range (for example, a band) in which a sync raster capable of initial access is included may be reported to the UE by embedding piece(s) of the information into certain bits (reserved code points in the bits for reporting a sync raster to be searched) included in an SS/PBCH block. For example, such pieces of information are reported to the UE by embedding information (for example, information enabling identification of a sync raster range to be searched) when a sync raster capable of initial access is absent within a certain range, by using code points other than the bits (code points) used to report a sync raster. In this case, the UE can control search of a sync raster without performing variable interpretation of the bit information.

In contrast, when a sync raster is reported to the UE by using pdcchConfigSIB1, this can be applied only when RMSI associated with the SS/PBCH block is absent. For example, an SSB (carrier) detected in an SS raster at the time of initial access can be classified into cases 1 to 4 shown in FIG. 4.

Case 1: In an SS/PBCH block of a certain cell, when cellBarred indicates "notBarred", intraFreqReselection indicates "allowed", RMSI associated with the SS/PBCH block is present, and access to the cell is allowed, the UE accesses the cell (carrier).

Case 2: In an SS/PBCH block of a certain cell, when cellBarred indicates "notBarred", intraFreqReselection indicates "allowed", RMSI associated with the SS/PBCH block is present, and access to the cell is not allowed, the UE searches for the next sync raster. If access is not allowed, for example, a PLMN-ID may not be an available PLMN-ID.

Case 3: In an SS/PBCH block of a certain cell, when cellBarred indicates "Barred", intraFreqReselection indicates "not allowed", RMSI associated with the SS/PBCH block is absent, and access to the cell is not allowed, the UE searches for the next sync raster.

Case 4: In an SS/PBCH block of a certain cell, when cellBarred indicates "Barred", intraFreqReselection indicates "not allowed", RMSI (for Automatic Neighbor Relation (ANR)) associated with the SS/PBCH block is present, and access to the cell is not allowed, the UE searches for the next sync raster. With ANR, the base station receives information of neighboring cells from the UE, and automatically updates a list of neighboring cells based on the information. ANR is similar to a self-organizing network (SON). A network supporting ANR transmits RMSI (SIBs) even if it is a cell for NSA, and a UE supporting ANR reads the RMSI.

In the case of FIG. 4, when a sync raster is reported to the UE by using pdcchConfigSIB1, this can be applied only when case 3 is used. The application is not possible for another case in which initial access is not supported (for example, notBarred/not allowed), i.e., case 4.

In view of this, the inventors of the present invention focused on a case in which RMSI associated with an SS/PBCH block not supporting initial access is present, and came up with the idea of switching information elements to be used to report a sync raster, based on presence or absence of associated RMSI. For example, when RMSI is present, information of a sync raster to be searched is specified by using an information element other than pdcchConfigSIB1. Note that, in this case, pieces of information to be reported by using a sync raster not supporting initial access may also be switched depending on whether or not a sync raster capable of initial access is present within a certain frequency range.

Embodiments according to the present invention will be described in detail with reference to the drawings as follows. Each aspect of the embodiments may be employed independently or may be employed in combination. In the following description, description is given by taking an example of a case in which cellBarred indicates "Barred" and intraFreqReselection indicates "not allowed" as an SS/PBCH block (or a sync raster) not supporting initial access. However, the SS/PBCH block not supporting initial access is not limited to the above. The SS/PBCH block not supporting initial access may be an SS/PBCH block for an SCell.

The following description illustrates a case in which at least one of an information element related to an SS/PBCH block index (for example, Ssb-IndexExplicit), an information element related to a subcarrier offset of an SS/PBCH block (Ssb-subcarrierOffset), and an information element related to a PDCCH configuration (pdcchConfigSIB1) is used as an information element to be used to report a sync raster. However, another information element may be used instead.

(First Aspect)

A first aspect gives description of a case in which information related to a sync raster that the UE is to search is reported by using bits (also referred to as bit information) of a certain information element included in an SS/PBCH block (for example, an NR-PBCH) transmitted in a frequency band (sub-6) lower than 6 GHz. The following description is given by taking an example of a case in which RMSI associated with an SS/PBCH block not supporting initial access is not present.

Figure 5:
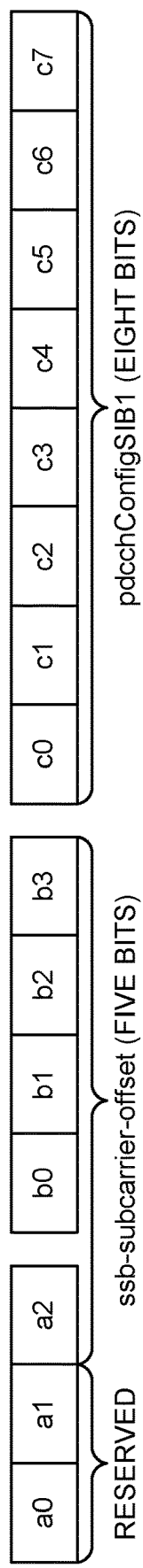
FIG. 5 is a diagram to show an example of information elements to be used to report a sync raster.

FIG. 5 shows certain information elements (MIB contents) included in the NR-PBCH in sub-6. In FIG. 5, a0 to a2 correspond to an information element for an SS block index (for example, Ssb-IndexExplicit), b0 to b3 correspond to an information element for a subcarrier offset (for example, Ssb-subcarrierOffset), and c0 to c7 correspond to an information element for a downlink control channel configuration (for example, pdcchConfigSIB1). Specifically, one bit (here, a2) out of a0 to a2 is used in combination with b0 to b3 to be used for the information element for a subcarrier offset.

When an SS/PBCH block does not support initial access, presence or absence of RMSI associated with the SS/PBCH block (RMSI presence) may be reported by using any one of a0 to a2 and b0 to b3. For example, presence or absence of RMSI is reported to the UE by using any one bit out of a0, a1, a2, and b0. Reporting the presence or absence of the RMSI enables to make a distinction between case 3 and case 4 in FIG. 4. Note that, when an SS/PBCH block does not support initial access, the UE may assume (or implicitly interpret) that the information element related to a subcarrier offset (Ssb-subcarrierOffset) indicates 0. In this manner, when an SS/PBCH block does not support initial access, Ssb-subcarrierOffset can be used to report other information (for example, presence or absence of RMSI and so on).

When RMSI is not present (RMSI presence is false), an indication of variable interpretation of bit information of the information elements is provided by using any one of a0 to a2 and b0 to b3 except for the bits used to report the presence or absence of the RMSI. For example, an indication of an interpretation method for bits of the information elements (variable interpretation of sync raster information) is provided for the UE by using any one bit out of a0, a1, a2, b0, and b1 (one bit that is different from the one bit used to report the presence or absence of the RMSI). Note that the indication of the variable interpretation may be provided by using c0 to c7.

For example, a plurality of variable interpretation patterns (or interpretation patterns) may be set in advance, and an indication of a variable interpretation pattern to be applied may be provided for the UE by using any one of a0, a1, a2, b0, and b1. Information related to the variable interpretation patterns may be informed to the UE in advance (for example, defined in a specification and so on).

As the variable interpretation patterns, for example, the following variable interpretation pattern A and variable interpretation pattern B may be set, and either one of these may be specified.

<Variable Interpretation Pattern A>

An offset with respect to a sync raster to be searched next is reported by using at least a part of the remaining bit(s) (for example, 13 bits) except for the two bits used for the indication of the presence or absence of the RMSI and the variable interpretation out of {a0-a2}, {b0-b3}, and {c0-c7}.

The offset may be an offset with respect to the current sync raster (sync raster not supporting initial access).

The variable interpretation pattern A can be preferably applied when the sync raster to be searched next is included in a certain frequency range (for example, a range that can be specified by using the remaining bit information).

By using the variable interpretation pattern A, a range of a sync raster that the UE is to search next can be accurately specified, and thus the UE can be appropriately informed of a sync raster supporting initial access. In this manner, delay can be prevented and increase in power consumption can be prevented in initial access.

<Variable Interpretation Pattern B>

Information related to a sync raster range to be searched next is reported by using at least a part of the remaining bit(s) (for example, 13 bits) except for the two bits used for the indication of the presence or absence of the RMSI and the variable interpretation out of {a0-a2}, {b0-b3}, and {c0-c7}. The information related to a sync raster range to be searched next may be information for specifying a range in which a sync raster to be searched is included, or may be information for specifying a range of a skippable sync raster (a sync raster that does not require search).

For the information for specifying a sync raster range to be searched or a skippable sync raster range, at least one of a number of a band to be searched, an approximate sync raster range to be searched within the band, and a mobile country code (MCC) number may be used.

For example, when the band number is represented using certain bits (for example, nine bits), an indication of a sync raster search range within a band to be reported may be provided by using the remaining bit(s) (one to four bits) out of the 13 bits. For example, either the higher half region or the lower half region of a frequency region within the band may be reported.

Reporting the mobile country code (MCC) number to the UE enables the UE to identify a band to be searched, based on a SIM and/or information in a terminal. For example, when the MCC number is represented using certain bits (for example, 10 bits), information related to a search range of a sync raster may be reported by using the remaining bit(s) (one to three bits) out of the 13 bits. For the information related to the search range of a sync raster may be, for example, a part of a network number (Mobile Network Code (MNC)) and/or a part of band information may be used.

A part of information may be reported instead of reporting the whole band number or MCC number. For example, the band number and/or the MCC number may be grouped (the number of bits thereof is reduced), and an ID of such a certain band group resulting from the grouping and/or an ID of such an MCC group may be reported by using certain bits. In this case, the sync raster search range within a band can be specified in detail by using the remaining bit(s).

The variable interpretation pattern B can be preferably applied when the sync raster to be searched next is not included in a certain frequency range (for example, a range that can be specified by using the remaining bit information).

By using the variable interpretation pattern B, a range of a sync raster that the UE is to search next can be specified to a certain degree even when a sync raster to be searched next is not included in a certain frequency range (for example, a range that can be specified by using the remaining bit information). In this manner, the UE can be informed of a sync raster supporting initial access to a certain degree, and thus delay can be prevented and increase in power consumption can be prevented in initial access.

The application of a plurality of variable interpretation patterns defining ranges of sync rasters to be searched next with different granularities by switching (or variably interpreting) the plurality of variable interpretation patterns allows for an appropriate specification of a range depending on a position of a sync raster to be searched next. In this manner, occurrence of delay and increase in power consumption at the time of initial access can be prevented.

(Second Aspect)

A second aspect gives description of a case in which information related to a sync raster that the UE is to search is reported by using bits of a certain information element included in an SS/PBCH block (for example, an NR-PBCH) transmitted in a frequency band (above-6) higher than 6 GHz. The following description concerns a case in which RMSI associated with an SS/PBCH block not supporting initial access is not present.

Figure 6:
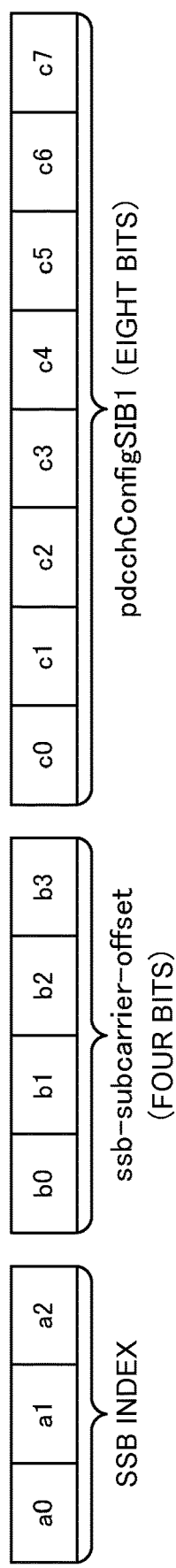
FIG. 6 is a diagram to show another example of information elements to be used to report a sync raster.

FIG. 6 shows certain information elements (MIB contents) included in the NR-PBCH in above-6. In FIG. 6, a0 to a2 correspond to an information element for an SS block index (for example, Ssb-IndexExplicit), b0 to b3 correspond to an information element for a subcarrier offset (for example, Ssb-subcarrierOffset), and c0 to c7 correspond to an information element for a downlink control channel configuration (for example, pdcchConfigSIB1).

In avobe-6, a0 to a2 are used to report the SS block index, and thus cannot be used as bits for specifying a range of a sync raster. In other words, in above-6, information related to a sync raster is reported by using b0 to b3 (four bits) corresponding to the information element for a subcarrier offset and c0 to c7 (eight bits) corresponding to the information element for a downlink control channel configuration.

When an SS/PBCH block does not support initial access, presence or absence of RMSI associated with the SS/PBCH block (RMSI presence) may be reported by using any one of b0 to b3. For example, presence or absence of RMSI is reported to the UE by using one bit of b0. Reporting the presence or absence of the RMSI enables to make a distinction between case 3 and case 4 in FIG. 4. Note that, when an SS/PBCH block does not support initial access, the UE may assume (or implicitly interpret) that the information element related to a subcarrier offset (Ssb-subcarrierOffset) indicates 0. In this manner, when an SS/PBCH block does not support initial access, Ssb-subcarrierOffset can be used to report other information (for example, presence or absence of RMSI and so on).

When RMSI is not present (RMSI presence is false), an indication of an interpretation method (variable interpretation) for bit information of the information elements is provided by using any one of b0 to b3 except for the bits used to report the presence or absence of the RMSI. For example, an indication of an interpretation method (variable interpretation) for the remaining bit(s) of the information elements is provided for the UE by using one bit of b1 (one bit that is different from the one bit used to report the presence or absence of the RMSI). Note that the indication of the variable interpretation may be provided by using c0 to c7.

For example, a plurality of variable interpretation patterns may be set in advance, and an indication of a variable interpretation pattern to be applied may be provided for the UE by using b1. Information related to the variable interpretation patterns may be informed to the UE in advance (for example, defined in a specification and so on).

As the variable interpretation patterns, for example, the following variable interpretation pattern A and variable interpretation pattern B may be set, and either one of these may be specified.

<Variable Interpretation Pattern A>

An offset with respect to a sync raster to be searched next is reported by using at least a part of the remaining bit(s) (for example, 10 bits) except for the two bits used for the indication of the presence or absence of the RMSI and the indication of the variable interpretation out of {b2-b3} and {c0-c7}. The offset may be an offset with respect to the current sync raster (sync raster not supporting initial access).

The variable interpretation pattern A can be preferably applied when the sync raster to be searched next is included in a certain frequency range (for example, a range that can be specified by using the remaining bit information).

By using the variable interpretation pattern A, a range of a sync raster that the UE is to search next can be accurately specified, and thus the UE can be appropriately informed of a sync raster supporting initial access. In this manner, delay can be prevented and increase in power consumption can be prevented in initial access.

<Variable Interpretation Pattern B>

Information related to a sync raster range to be searched next is reported by using at least a part of the remaining bit(s) (for example, 10 bits) except for the two bits used for the indication of the presence or absence of the RMSI and the indication of the variable interpretation out of {b2-b3} and {c0-c7}. The information related to a sync raster range to be searched next may be information for specifying a range in which a sync raster to be searched is included, or may be information for specifying a range of a skippable sync raster (a sync raster that does not require search).

For the information for specifying a sync raster range to be searched next or a skippable sync raster range, at least one of a number of a band to be searched next, an approximate sync raster range to be searched within the band, and a mobile country code (MCC) number may be used.

For example, when the band number is represented using certain bits (for example, nine bits), an indication of a sync raster search range within a band to be reported may be provided by using the remaining bit(s) (one bit) out of the 10 bits. For example, either the higher half region or the lower half region of a frequency region within the band may be reported.

Reporting the mobile country code (MCC) number to the UE enables the UE to identify a band to be searched, based on a SIM and/or information in a terminal. For example, when the MCC number is represented using certain bits (for example, 10 bits), the MCC number may be reported by using 10 bits.

A part of information may be reported instead of reporting the whole band number or MCC number. For example, the band number and/or the MCC number may be grouped, and an ID of such a certain band group resulting from the grouping and/or an ID of such an MCC group may be reported by using certain bits. In this case, the sync raster search range (for example, a part of the network number (Mobile Network Code (MNC)) and/or a part of the band information) within a band can be specified in detail by using the remaining bit(s).

The variable interpretation pattern B can be preferably applied when the sync raster to be searched next is not included in a certain frequency range (for example, a range that can be specified by using the remaining bit information).

By using the variable interpretation pattern B, a range of a sync raster that the UE is to search next can be specified to a certain degree even when a sync raster to be searched next is not included in a certain frequency range (for example, a range that can be specified by using the remaining bit information). In this manner, the UE can be informed of a sync raster supporting initial access to a certain degree, and thus delay can be prevented and increase in power consumption can be prevented in initial access.

The application of a plurality of variable interpretation patterns defining ranges of sync rasters to be searched next with different granularities by switching (or variably interpreting) the plurality of variable interpretation patterns allows for an appropriate specification of a range depending on a position of a sync raster to be searched next. In this manner, occurrence of delay and increase in power consumption at the time of initial access can be prevented.

(Third Aspect)

A third aspect gives description of a case in which RMSI associated with an SS/PBCH block not supporting initial access is present (RMSI presence is true).

<In sub-6>

In sub-6, when an SS/PBCH block does not support initial access, presence or absence of RMSI associated with the SS/PBCH block (RMSI presence) is reported by using any one of a0 to a2 and b0 to b3 (see FIG. 5). For example, presence or absence of RMSI is reported to the UE by using any one bit out of a0, a1, a2, and b0. Reporting the presence or absence of the RMSI enables to make a distinction between case 3 and case 4 in FIG. 4. Note that, when an SS/PBCH block does not support initial access, the UE may assume (or implicitly interpret) that the information element related to a subcarrier offset (Ssb-subcarrierOffset) indicates 0. In this manner, when an SS/PBCH block does not support initial access, Ssb-subcarrierOffset can be used to report other information (for example, presence or absence of RMSI and so on).

When RMSI is present (RMSI presence is true), an indication of variable interpretation of bit information of the information elements is provided by using any one of a0 to a2 and b0 to b3 except for the bits used to report the presence or absence of the RMSI. Note that, when RMSI is present, c0 to c7 corresponding to the information element for a downlink control channel configuration (for example, pdcchConfigSIB1) are used to report a PDCCH configuration for RMSI, and thus cannot be used to specify a sync raster.

For example, an indication of variable interpretation of sync raster information represented by the remaining bit(s) of the information element(s) (Ssb-IndexExplicit and/or Ssb-subcarrierOffset) is provided for the UE by using any one bit out of a0, a1, a2, b0, and b1 (one bit that is different from the one bit used to report the presence or absence of the RMSI).

For example, a plurality of variable interpretation patterns may be set in advance, and an indication of a variable interpretation pattern to be applied may be provided for the UE by using any one of a0, a1, a2, b0, and b1. Information related to the variable interpretation patterns may be informed to the UE in advance (for example, defined in a specification and so on).

As the variable interpretation patterns, for example, the following variable interpretation pattern A and variable interpretation pattern B may be set, and either one of these may be specified.

<Variable Interpretation Pattern A>

An offset with respect to a sync raster to be searched next is reported by using at least a part of the remaining bit(s) (for example, five bits) except for the two bits used for the indication of the presence or absence of the RMSI and the indication of the variable interpretation out of {a0-a2} and {b0-b3}. The offset may be an offset with respect to the current sync raster (sync raster not supporting initial access).

Alternatively, a certain range (for example, a frequency range) may be divided into a plurality of blocks, and any one of the divided ranges may be specified with respect to a position of a sync raster being searched.

By using the variable interpretation pattern A, a range of a sync raster that the UE is to search next can be accurately specified, and thus the UE can be appropriately informed of a sync raster supporting initial access. In this manner, delay can be prevented and increase in power consumption can be prevented in initial access.

<Variable Interpretation Pattern B>

Information related to a sync raster range to be searched next is reported by using at least a part of the remaining bit(s) (for example, five bits) except for the two bits used for the indication of the presence or absence of the RMSI and the indication of the variable interpretation out of {a0-a2} and {b0-b3}. The information related to a sync raster range to be searched next may be information for specifying a range in which a sync raster to be searched is included, or may be information for specifying a range of a skippable sync raster (a sync raster that does not require search).

For the information for specifying a sync raster range to be searched or a skippable sync raster range, at least one of a number of a band to be searched, an approximate sync raster range to be searched within the band, and a mobile country code (MCC) number may be used.

A part of information may be reported instead of reporting the whole band number or MCC number. For example, the band number and/or the MCC number may be grouped, and an ID of such a certain band group resulting from the grouping and/or an ID of such an MCC group may be reported by using certain bits. In this case, the sync raster search range (for example, a part of the network number (Mobile Network Code (MNC)) and/or a part of the band information) within a band can be specified in detail by using the remaining bit(s).

By using the variable interpretation pattern B, a range of a sync raster that the UE is to search next can be specified to a certain degree even when a sync raster to be searched next is not included in a certain frequency range (for example, a range that can be specified by using the remaining bit information). In this manner, the UE can be informed of a sync raster supporting initial access to a certain degree, and thus delay can be prevented and increase in power consumption can be prevented in initial access.

<In Above-6>

In avobe-6, a0 to a2 are used to report the SS block index, and thus cannot be used as bits for specifying a sync raster to be searched. For this reason, in above-6, when an SS/PBCH block does not support initial access, presence or absence of RMSI associated with the SS/PBCH block (RMSI presence) is reported by using any one of b0 to b3 (see FIG. 6). Thus, presence or absence of RMSI is reported to the UE by using any one bit (for example, b0) out of b0 to b3.

When RMSI is present (RMSI presence is true), an indication of variable interpretation of bit information of the information elements is provided by using any one of b0 to b3 (for example, b1 to b3) except for the bits used to report the presence or absence of the RMSI. Note that, when RMSI is present, c0 to c7 corresponding to the information element for a downlink control channel configuration (for example, pdcchConfigSIB1) are used to report a PDCCH configuration for RMSI, and thus cannot be used to specify a sync raster.

For example, an indication of variable interpretation of sync raster information represented by the remaining bit(s) of the information element (Ssb-subcarrierOffset) is provided for the UE by using one bit of b1. In this case, a plurality of variable interpretation patterns may be set in advance, and an indication of a variable interpretation pattern to be applied may be provided for the UE by using b1. Information related to the variable interpretation patterns may be informed to the UE in advance (for example, defined in a specification and so on).

As the variable interpretation patterns, for example, the following variable interpretation pattern A and variable interpretation pattern B may be set, and either one of these may be specified.

<Variable Interpretation Pattern A>

Information related to a sync raster to be searched next is reported by using at least a part of the remaining bit(s) (for example, two bits) except for the two bits used for the indication of the presence or absence of the RMSI and the indication of the variable interpretation out of {b0-b3}. The base station may provide an indication of variable interpretation (interpretation method) of the remaining bit(s) {b2, b3} for the UE by using one bit of b1.

For example, a certain range (for example, a frequency range) may be divided into a plurality of blocks, and any one of the divided ranges may be specified with respect to a position of a sync raster being searched. In one example, with the use of the remaining two bits, any one of four blocks (+1 to +168, +169 to +336, −1 to −168, and −1 to −336) is specified with respect to a position of a sync raster being searched.

By using the variable interpretation pattern A, a range of a sync raster that the UE is to search next can be specified to a certain degree even when c0 to c7 corresponding to an information element for a downlink control channel configuration (for example, pdcchConfigSIB1) are unavailable.

<Variable Interpretation Pattern B>

Information related to a sync raster range to be searched next is reported by using at least a part of the remaining bit(s) (for example, two bits) except for the two bits used for the indication of the presence or absence of the RMSI and the variable interpretation out of {b0-b3}. The information related to a sync raster range to be searched next may be information for specifying a range in which a sync raster to be searched is included, or may be information for specifying a range of a skippable sync raster (a sync raster that does not require search).

For the information for specifying a sync raster range to be searched or a skippable sync raster range, at least one of a number of a band to be searched, an approximate sync raster range to be searched within the band, and a mobile country code (MCC) number may be used.

A part of information may be reported instead of reporting the whole band number or MCC number. For example, the band number and/or the MCC number may be grouped, and an ID of such a certain band group resulting from the grouping and/or an ID of such an MCC group may be reported by using certain bits. In this case, the sync raster search range (for example, a part of the network number (Mobile Network Code (MNC)) and/or a part of the band information) within a band can be specified in detail by using the remaining bit(s).

By using the variable interpretation pattern B, a range of a sync raster that the UE is to search next can be specified to a certain degree even when a sync raster to be searched next is not included in a certain frequency range (for example, a range that can be specified by using the remaining bit information).

(Variations)

The first aspect to the third aspect described above illustrate a case in which a range of a sync raster to be searched next is reported by using information elements (MIB contents) included in a PBCH of an SS/PBCH block, but the present invention is not limited to the case. Information related to a sync raster to be searched next may be included in an SIB (for example, SIB1).

For example, a sync raster to be searched is specified by using a certain bit field included in SIB1. In this case, a plurality of patterns of a range of a sync raster specified using a certain bit field may be set, and an indication of a variable interpretation pattern to be applied may be provided for the UE by using certain bits included in SIB1.

As the variable interpretation patterns included in SIB1, the variable interpretation pattern A and the variable interpretation pattern B in the first aspect to the third aspect described above may be used.

When RMSI (for example, SIB1) associated with an SS/PBCH block is present, the UE controls a sync raster to be searched next, based on information related to a sync raster range included in the RMSI.

The first aspect to the third aspect described above illustrate a case in which bits of other information elements are variably interpreted based on a certain bit(s) (for example, one bit) included in a PBCH of an SS/PBCH block. However, the present embodiment is not limited to the case.

At least one of information indicating that a sync raster capable of initial access is not present within a certain range and information enabling identification of a range (for example, a band) in which a sync raster capable of initial access is included may be reported to the UE by embedding the piece(s) of information into a certain bit(s) (reserved code points in the bits for reporting a sync raster to be searched) included in an SS/PBCH block.

For example, with the use of reserved code points other than the bits (code points) used to report a sync raster, such pieces of information are reported to the UE by embedding the first bit information for indicating presence or absence of a sync raster capable of initial access within a certain range and the second bit information for specifying a sync raster range to be searched when a sync raster capable of initial access is absent within a certain range. When the first bit information indicates that a sync raster capable of initial access is not present within a certain range, the UE may determine a range of a sync raster to be searched next, based on the second bit information. In this case, the UE can control search of a sync raster without performing variable interpretation of the bit information.

(Radio Communication System)

Hereinafter, a structure of a radio communication system according to one embodiment of the present invention will be described. In this radio communication system, the radio communication method according to each embodiment of the present invention described above may be used alone or may be used in combination for communication.

Figure 7:
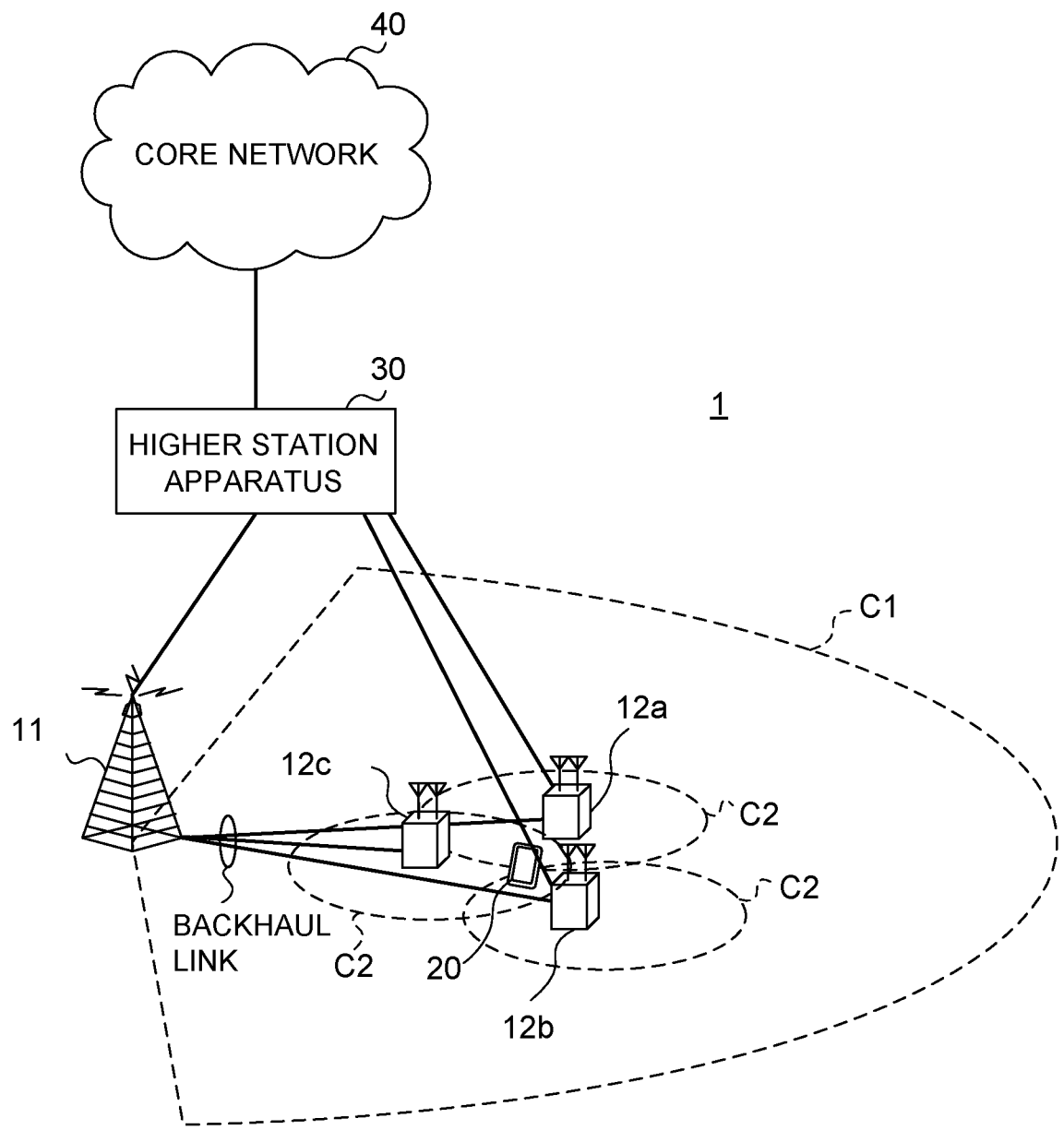
FIG. 7 is a diagram to show an example of a schematic structure of a radio communication system according to one embodiment of the present invention.

FIG. 7 is a diagram to show an example of a schematic structure of the radio communication system according to one embodiment of the present invention. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 may adopt CA or DC by using a plurality of cells (CCs) (for example, five or less CCs, or six or more CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands including one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including PDSCH and/or PUSCH scheduling information, and so on are communicated on the PDCCH.

Note that the scheduling information may be reported by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Transmission confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, transmission confirmation information, a scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

<Radio Base Station>

Figure 8:
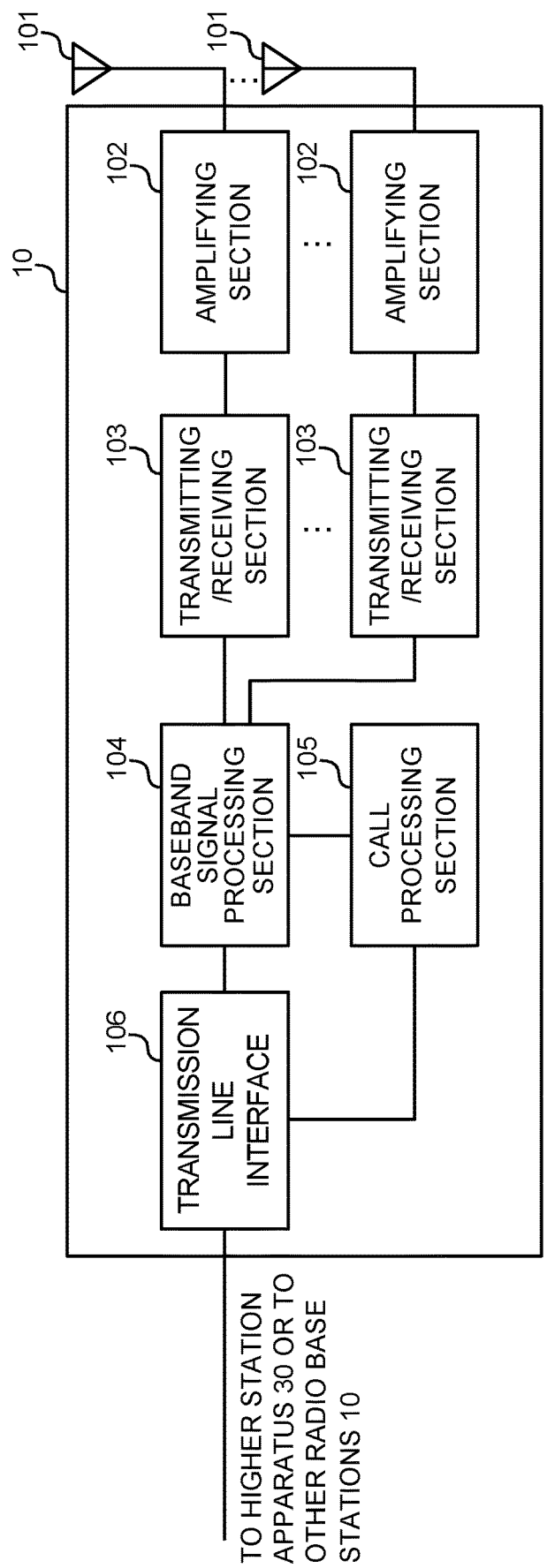
FIG. 8 is a diagram to show an example of an overall structure of a radio base station according to one embodiment of the present invention.

FIG. 8 is a diagram to show an example of an overall structure of the radio base station according to one embodiment of the present invention. A radio base station 10 includes a plurality of transmitting/receiving antennas 101, amplifying sections 102, transmitting/receiving sections 103, a baseband signal processing section 104, a call processing section 105 and a transmission line interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the transmission line interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present invention pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the transmission line interface 106. The call processing section 105 performs call processing (setting up, releasing and so on) for communication channels, manages the state of the radio base station 10, manages the radio resources and so on.

The transmission line interface 106 transmits and/or receives signals to and/or from the higher station apparatus 30 via a certain interface. The transmission line interface 106 may transmit and/or receive signals (backhaul signaling) with other radio base stations 10 via an inter-base station interface (for example, an optical fiber in compliance with the CPRI (Common Public Radio Interface) and an X2 interface).

Each of the transmitting/receiving sections 103 may transmit a synchronization signal block (for example, an SSB or an SS/PBCH block) including a broadcast channel (for example, a PBCH).

Figure 9:
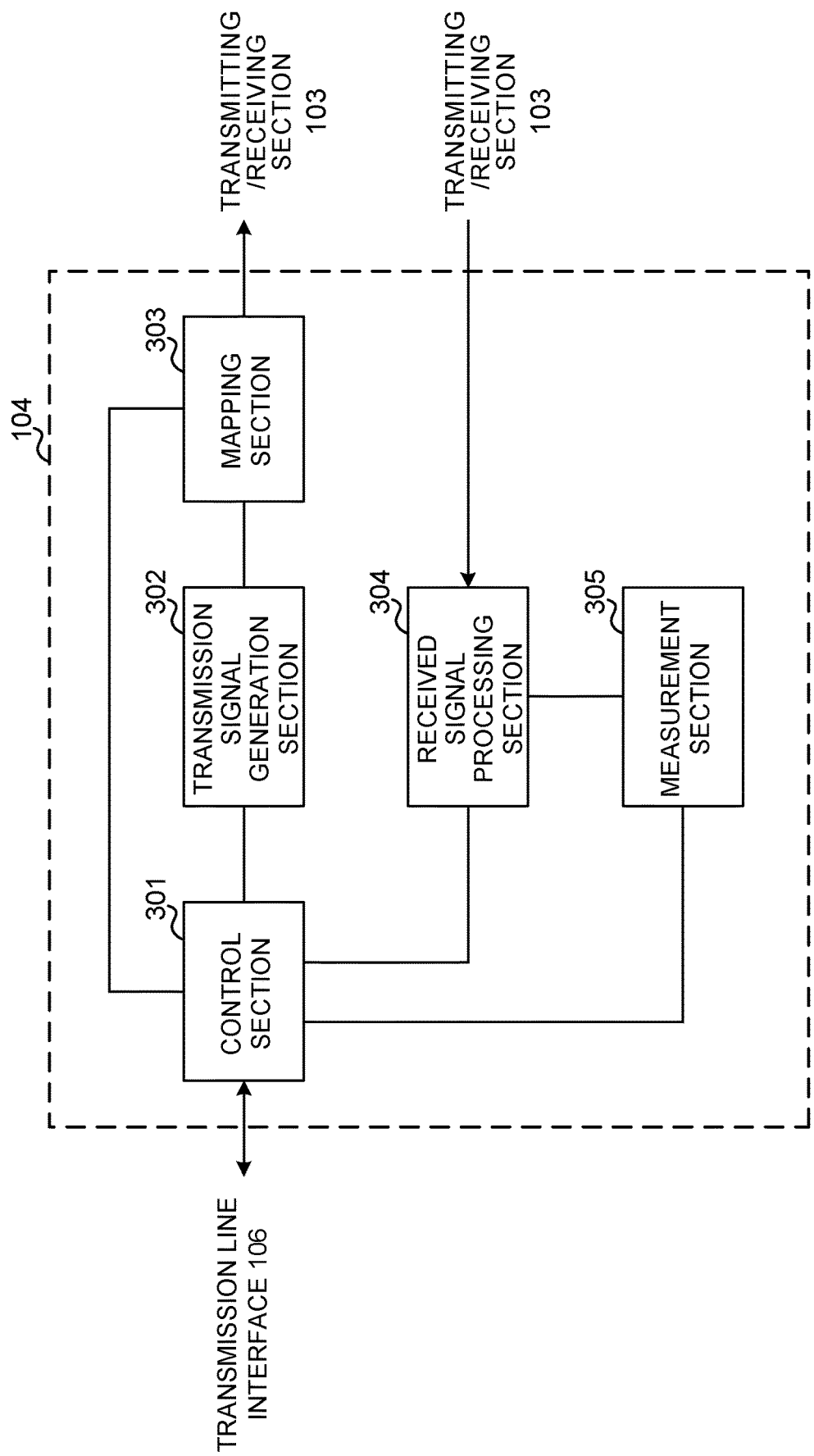
FIG. 9 is a diagram to show an example of a functional structure of the radio base station according to one embodiment of the present invention.

FIG. 9 is a diagram to show an example of a functional structure of the radio base station according to one embodiment of the present invention. Note that, the present example primarily shows functional blocks that pertain to characteristic parts of the present embodiment, and it is assumed that the radio base station 10 includes other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present invention pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls scheduling (for example, resource allocation) of system information, a downlink data signal (for example, a signal transmitted on a PDSCH), and a downlink control signal (for example, a signal transmitted on a PDCCH and/or an EPDCCH, transmission confirmation information, and so on). Based on the results of determining necessity or not of retransmission control to the uplink data signal, or the like, the control section 301 controls generation of a downlink control signal, a downlink data signal, and so on. The control section 301 controls the scheduling of a synchronization signal (for example, a PSS (Primary Synchronization Signal)/an SSS (Secondary Synchronization Signal)), a downlink reference signal (for example, a CRS, a CSI-RS, a DMRS), and so on.

The control section 301 controls the scheduling of an uplink data signal (for example, a signal transmitted on the PUSCH), an uplink control signal (for example, a signal transmitted on the PUCCH and/or the PUSCH, transmission confirmation information, and so on), a random access preamble (for example, a signal transmitted on the PRACH), an uplink reference signal, and so on.

The control section 301 performs control so that information related to a sync raster that the UE is to search is reported to the UE by embedding the information into an information element included in the SS/PBCH block. In this case, the control section 301 may perform control so that bits for specifying an interpretation method for bits for specifying a sync raster are included in a certain information element.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present invention pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present invention pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present invention pertains.

For example, the measurement section 305 may perform RRM (Radio Resource Management) measurement, CSI (Channel State Information) measurement, and so on, based on the received signal. The measurement section 305 may measure a received power (for example, RSRP (Reference Signal Received Power)), a received quality (for example, RSRQ (Reference Signal Received Quality)), an SINR (Signal to Interference plus Noise Ratio), a signal strength (for example, RSSI (Received Signal Strength Indicator)), channel information (for example, CSI), and so on. The measurement results may be output to the control section 301.

<User Terminal>

Figure 10:
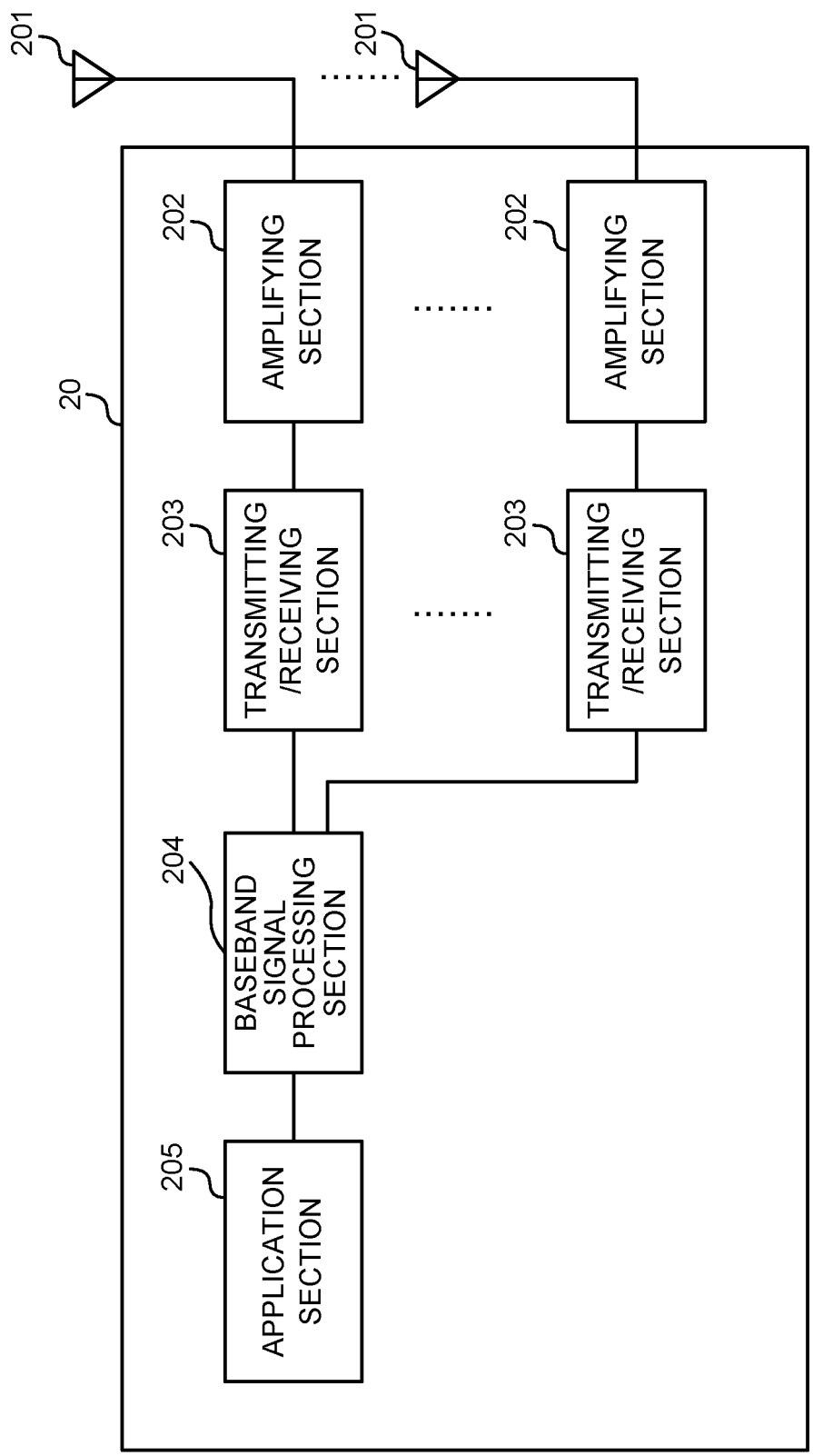
FIG. 10 is a diagram to show an example of an overall structure of a user terminal according to one embodiment of the present invention.

FIG. 10 is a diagram to show an example of an overall structure of a user terminal according to one embodiment of the present invention. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present invention pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

Each of the transmitting/receiving sections 203 receives a synchronization signal block (for example, an SSB or an SS/PBCH block) including a broadcast channel (for example, a PBCH).

Figure 11:
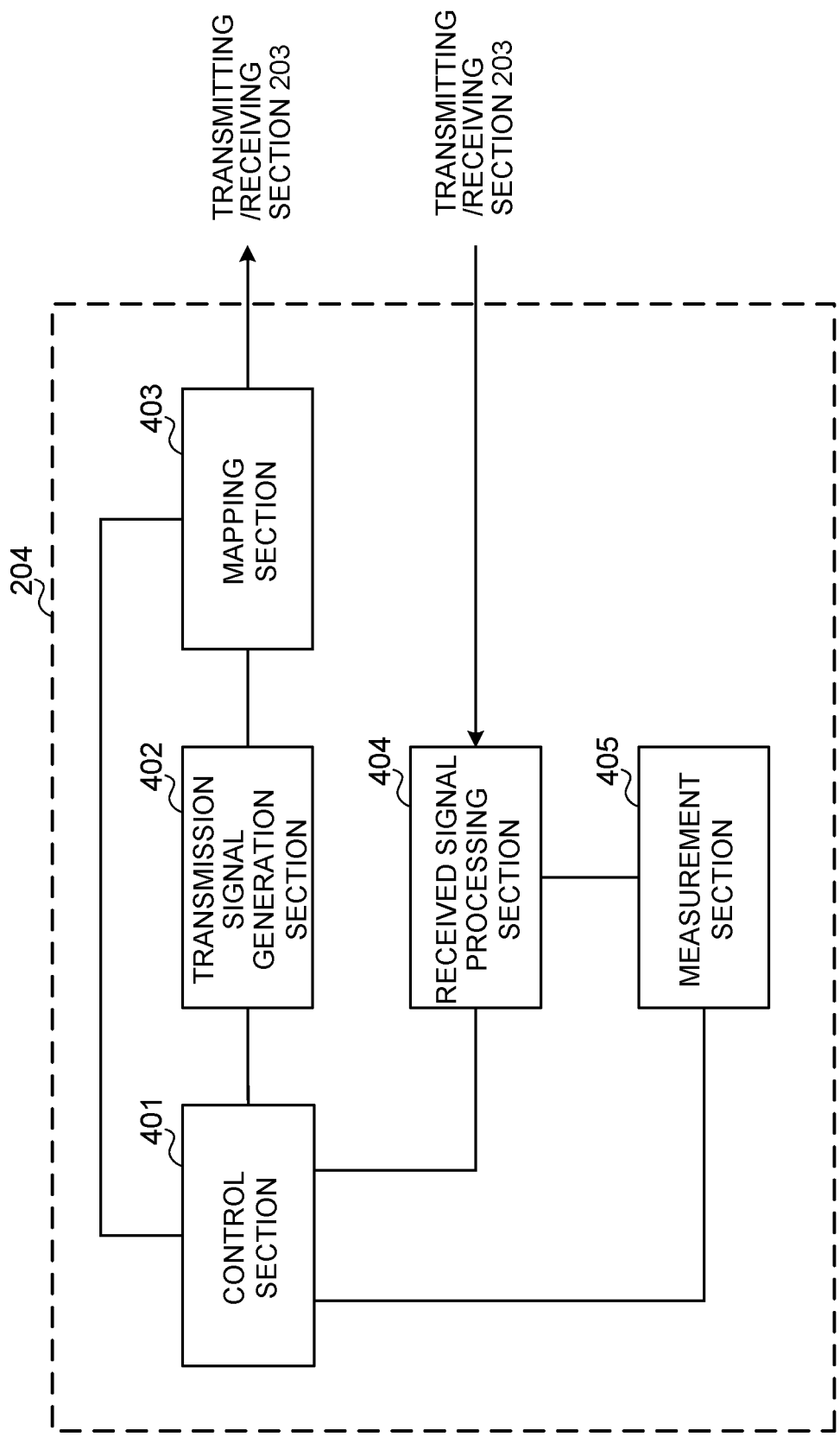
FIG. 11 is a diagram to show an example of a functional structure of the user terminal according to one embodiment of the present invention.

FIG. 11 is a diagram to show an example of a functional structure of a user terminal according to one embodiment of the present invention. Note that, the present example primarily shows functional blocks that pertain to characteristic parts of the present embodiment, and it is assumed that the user terminal 20 includes other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present invention pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

Further, when a received SS/PBCH block does not support initial access, the control section 401 controls, based on certain bit information of a certain information element included in the SS/PBCH block, a sync raster to be detected by variably interpreting bit information included in at least one of the certain information element and another information element.

For example, when the certain bit information indicates a first bit value, the control section 401 may judge at least one of a range of the sync raster to be detected and a skippable sync raster range, based on bit information included in at least one of the certain information element and the another information element. When the certain bit information indicates a second bit value, the control section 401 may judge an offset with respect to the sync raster to be detected, based on bit information included in at least one of the certain information element and the another information element.

When certain system information associated with the synchronization signal block to be transmitted is not present, the control section 401 may judge the sync raster to be detected, based on bit information included in an information element related to a configuration of a downlink physical control channel.

When certain system information associated with the synchronization signal block to be transmitted is present, the control section 401 may judge the sync raster to be detected, based on bit information included in an information element related to a subcarrier offset of the synchronization signal block without using an information element related to a configuration of a downlink physical control channel.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present invention pertains.

For example, the transmission signal generation section 402 generates an uplink control signal about transmission confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present invention pertains. The received signal processing section 404 can constitute the receiving section according to the present invention.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present invention pertains.

For example, the measurement section 405 may perform RRM measurement, CSI measurement, and so on, based on the received signal. The measurement section 405 may measure a received power (for example, RSRP), a received quality (for example, RSRQ, SINR), a signal strength (for example, RSSI), channel information (for example, CSI), and so on. The measurement results may be output to the control section 401.

<Hardware Structure>

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 12:
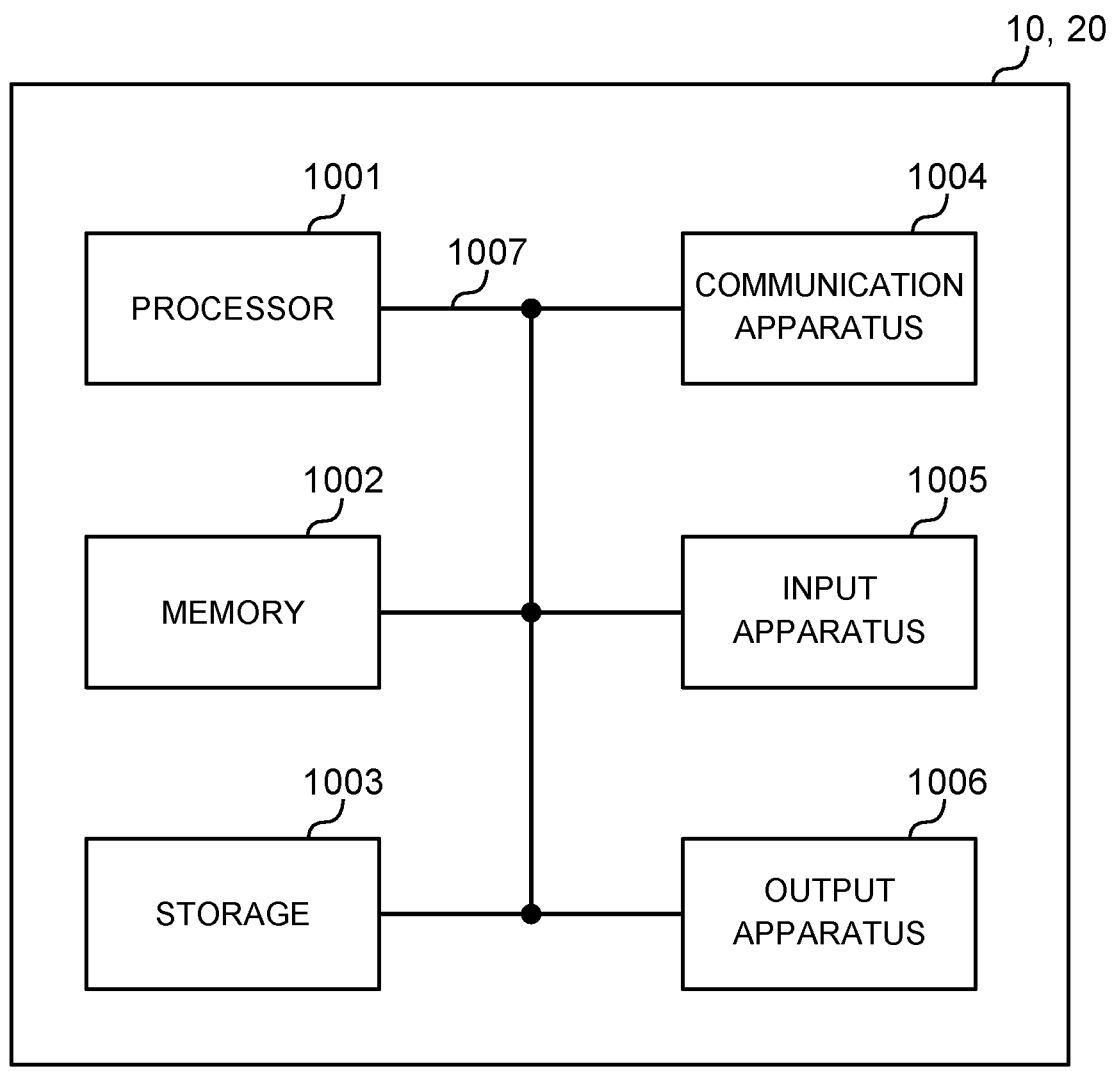
FIG. 12 is a diagram to show an example of a hardware structure of the radio base station and the user terminal according to one embodiment of the present invention.

For example, a radio base station, a user terminal, and so on according to one embodiment of the present invention may function as a computer that executes the processes of the radio communication method of the present invention. FIG. 12 is a diagram to show an example of a hardware structure of the radio base station and the user terminal according to one embodiment of the present invention. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control reading and/or writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present invention.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via a wired and/or wireless network, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), transmission line interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in this specification and/or the terminology that is needed to understand this specification may be replaced by other terms that convey the same or similar meanings. For example, "channels" and/or "symbols" may be "signals" ("signaling"). Also, "signals" may be "messages." A reference signal may be abbreviated as an "RS," and may be referred to as a "pilot," a "pilot signal," and so on, depending on which standard applies.

Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks, and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be specified by certain indexes.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names allocated to these various channels and information elements are in no respect limiting.

The information, signals, and so on described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers, and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported by using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" used in this specification are used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up, (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions and/or (both visible and invisible) optical regions, or the like.

In this specification, the phrase "A and B are different" may mean that "A and B are different from each other." The terms "separate," "be coupled" and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described in this specification. The present invention can be implemented with various corrections and in various modifications, without departing from the spirit and scope of the present invention defined by the recitations of claims. Consequently, the description in this specification is provided only for the purpose of explaining examples, and should by no means be construed to limit the present invention in any way.

What is claimed is:

1. A terminal comprising:
   a receiver that receives a synchronization signal/physical broadcast channel (SS/PBCH) block including a first information element regarding a subcarrier offset and a second information element regarding a downlink control channel for system information; and
   a processor that, when bit information is indicated by using the first information element, determines an offset from the SS/PBCH block to another SS/PBCH block or a range within which another SS/PBCH block is not present, by using at least one of the first information element and the second information element, wherein, when the bit information is a first bit value, the processor determines a range within which the another SS/PBCH block is not present, based on bit information included in the second information element.

2. The terminal according to claim 1, wherein, when the bit information is a second bit value, the processor determines an offset to the another SS/PBCH block, based on bit information in the first information element and bit information in the second information element.

3. The terminal according to claim 1, wherein the first information element is ssb-SubcarrierOffset and the second information element is pdcch-ConfigSIB1.

4. The terminal according to claim 2, wherein the first information element is ssb-SubcarrierOffset and the second information element is pdcch-ConfigSIB1.

5. A radio communication method comprising:
receiving a synchronization signal/physical broadcast channel (SS/PBCH) block including a first information element regarding a subcarrier offset and a second information element regarding a downlink control channel for system information; and
when bit information is indicated by using the first information element, determining an offset from the SS/PBCH block to another SS/PBCH block or a range within which another SS/PBCH block is not present, by using at least one of the first information element and the second information element,
wherein, when the bit information is a first bit value, determining a range within which the another SS/PBCH block is not present, based on bit information included in the second information element.

6. A base station comprising:
a transmitter that transmits a synchronization signal/physical broadcast channel (SS/PBCH) block including a first information element regarding a subcarrier offset and a second information element regarding a downlink control channel for system information; and
a processor that, when bit information is indicated by using the first information element, controls to notify an offset from the SS/PBCH block to another SS/PBCH block or a range within which another SS/PBCH block is not present, by using at least one of the first information element and the second information element,
wherein, when the bit information is a first bit value, the processor determines a range within which the another SS/PBCH block is not present, based on bit information included in the second information element.

7. A system comprising a terminal and a base station, wherein
the terminal comprises:
a receiver that receives a synchronization signal/physical broadcast channel (SS/PBCH) block including a first information element regarding a subcarrier offset and a second information element regarding a downlink control channel for system information; and
a processor of the terminal that, when bit information is indicated by using the first information element, determines an offset from the SS/PBCH block to another SS/PBCH block or a range within which another SS/PBCH block is not present, by using at least one of the first information element and the second information element,
wherein, when the bit information is a first bit value, the processor determines a range within which the another SS/PBCH block is not present, based on bit information included in the second information element, and
the base station comprises:
a transmitter that transmits the SS/PBCH block including the first information element and the second information element; and
a processor of the base station that, when bit information is indicated by using the first information element, controls to notify an offset from the SS/PBCH block to another SS/PBCH block or a range within which another SS/PBCH block is not present, by using at least one of the first information element and the second information element.

* * * * *